United States Patent Office 3,362,951
Patented Jan. 9, 1968

3,362,951
POLYSACCHARIDE PRODUCT DERIVED FROM THE JUICE OF THE ALOE PLANT AND METHODS FOR PREPARING SAME
Alexander Farkas, 425 NE. 173rd St., North Miami Beach, Fla. 33162, and Robert A. Mayer, 1850 NW. 189th St., Opa Locka, Fla. 33054
No Drawing. Filed Dec. 21, 1965, Ser. No. 515,469
7 Claims. (Cl. 260—209)

ABSTRACT OF THE DISCLOSURE

A process for producing a highly pure aloe derivative comprising mixing aloe gel with an aqueous solution of phosphomolybdic acid, separating the insoluble precipitate, precipitating the aloe derivative with a water soluble aliphatic solvent, and clearing it with hypochlorous acid. Adding a measured amount of water to the solvent produces the hydrate, while withholding it produces the anhydrous derivative.

---

The present invention relates to a novel method for preparing a polysaccharide product derived from the juice of the aloe plant, and to the resulting novel product.

Polysaccharide products derived from the juice of the aloe plant are known to have therapeutic properties particularly in the treatment of wounds of the skin and other body tissue (see, for example, Patent 3,103,466).

The principal objects of the present invention are to provide substantial improvements in polysaccharide products derived from the juice of the aloe plant and in methods of processing the juice to provide such products.

These and other objects will become apparent from a consideration of the following specification and claims.

The foregoing objects are realized by a process which comprises: mixing, with the juice from the leaves of the aloe plant, a dilute aqueous solution of phosphomolybdic acid until precipitation of insoluble matter is substantially complete; separating the insoluble precipitate from the aqueous solution; mixing the aqueous solution with a water-soluble, lower aliphatic polar solvent until precipitation of blue-green insoluble matter is substantially complete; adding to the resulting dispersion of blue-green precipitate aqueous hypochlorous acid until said precipitate is essentially white, and recovering the precipitate.

The resulting product, preferably after washing one or more times with fresh, water-soluble, lower aliphatic polar solvent, is a white amorphous fibrous material which can be dispersed in water to form a gel, ground to a powder or dispersed in water and spray dried or dried as a thin film to form flakes.

In any event the dry product is a highly pure polysaccharide in the form of long polymer chains made up of repeating units, each of which units contains substantially equal amounts of glucose and mannose residues, these combining to make up the preponderant portion of the unit, a small proportion of glucuronic acid residue and chemically bound calcium. When the product is washed with water-soluble, lower-aliphatic polar solvent in anhydrous form, chemically bound water can be removed so that the product is essentially anhydrous. Otherwise, as when the washing solvent is hydrous, that is, contains a small amount of water, the product will be in the form of a hydrate. Analysis of the product shows:

| | Percent by wt. |
|---|---|
| Glucose residue | 35–40 |
| Mannose residue | 35–40 |
| Glucuronic acid residue | 1–2 |
| Chemically bound calcium | 13–16 |
| Chemically bound water | 0–9 |

When the product is a hydrate, the chemically bound water will amount to 6–9%, by weight.

Because of the relative proportions of glucuronic acid residue and calcium, only a small proportion of the calcium is combined with the carboxyl groups of the glucuronic acid portion of the molecule and the remaining is chemically bound to a portion each of the glucose and mannose portions of the molecule. The product has a very high molecular weight which averages about 450,000 but can vary from about 420,000 to about 520,000 depending upon slight variations in the process and upon the age of the juice or of the cut leaves from which it is pressed.

The novel polymer may be depicted as $$[(\text{glucose})_m \cdot (\text{mannose})_m \cdot (\text{Ca glucuronate})_n \cdot (\text{Ca})_p \cdot Y\text{H}_2\text{O}]_x$$

where $m$ is an integer providing from about 35 to about 40%, by weight, of the unit; $n$ is an integer providing from about 1 to about 2% of the unit; $p$ is an integer which, together with the calcium of the calcium glucuronate portion of the unit, provides from about 13 to about 16% of the unit; Y is an integer providing from essentially 0 to about 9% of the unit, and $x$ is an integer providing a molecular weight from about 420,000 to about 520,000. The preferred product is a hydrate in which Y in the foregoing formula is from about 6 to about 9.

The starting material according to the present invention is the juice from the leaves of the aloe plant. Aloe leaves, preferably washed, are shredded and the juice which exudes is collected. This raw juice is advantageously treated, as by filtering or centrifuging, to separate pulp therefrom. The juice can be concentrated before treatment according to the present invention. The juice used may also be reconstituted by adding water to dried stockpiled shredded material. The juice, before treatment according to the present invention, may be passed through a colloid mill or homogenizer to disintegrate mucilage globules and cellulose matter which tend to provide a gel-like character.

As stated, the first principal step of the process according to the present invention is to mix the juice with a dilute aqueous solution of phosphomolybdic acid. Concentrations of phosphomolybdic acid in the aqueous solution ranging from about 0.5 to about 5%, by weight, have been found to be satisfactory. The amount of phosphomolybdic acid solution will be such as to substantially completely precipitate solid matter which amounts to about 5%, by weight, of the total solids. This can readily be determined in any case by adding measured increments of the phosphomolybdic acid solutions from a calibrated burette to a measured sample of juice, waiting a short while after each addition for precipitate to settle and noting when a further addition causes no further precipitation. It has been found that the foregoing treatment with phosphomolybdic acid, among other things, precipitates, from the juice, proteins and amino acids, saponins, glucose amines, complex organic acids, vitamins, enzymes and sulfur-containing inorganic and organic compounds, including sulfur-containing amino acids. An important feature of this step is the precipitation of compounds that would otherwise cause discoloration of the product, namely hydroxyanthraquinone cumaric acid-resi-tannol and/or hydroxyanthraquinone - cinnamic-acid-resi-tannol, depending upon the source of the aloe plant.

After precipitation by virtue of the phosphomolybdic acid is substantially complete, the precipitate is physically separated from the aqueous solution, as by filtering, centrifuging, and the like.

The resulting aqueous solution, substantially free of the aforementioned precipitate, is then mixed with a water-soluble, lower aliphatic polar solvent until precipitation of blue-green insoluble matter is substantially complete. Amounts of solvent ranging from about 4 to about 6 volumes thereof per volume of aqueous solution have been fund to be satisfactory in this regard. Suitable solvents are methanol, ethanol, isopropanol, acetone, mixtures of two or more of these, and mixtures with one or more of these with diethyl ether. Methanol is preferred.

The blue-green precipitate is physically separated from the aqueous-solvent mixture, as by filtering, centrifuging, and the like. The solvent may be separated from the aqueous phase for reuse, as by vacuum distillation.

The resulting precipitate is then dispersed in further water-soluble, lower aliphatic polar solvent, of the type discussed above. An amount of solvent ranging from about 3 to about 4 volumes thereof per volume of precipitate has been found suitable.

Aqueous hypochlorous acid is then added to the dispersion of blue-green precipitate until the precipitate is essentially white.

Following physical separation of the essentially white precipitate, as by filtering, centrifuging, and the like, it is washed with fresh water-soluble, lower aliphatic polar solvent, of the type discussed above. The washing solvent may contain a small amount of water—from about 0.5 to about 10%—and hence may be hydrous as distinguished from anhydrous or dehydrated materials of this nature. In this case the hydrate form of product will be maintained. However, the solvent may be essentially anhydrous, in which case chemically bound water will be removed. Washing may be and preferably is repeated one or more times, a total of two to four washings being preferred. An amount of solvent, for each washng, ranging from about three to about five volumes, per volume of precipitate has been found to be suitable. Washing may be accomplished by dispersing the precipitate in the solvent with agitation, followed by physical separation, as by filtering, centrifuging, and the like.

Following the last washing the precipitate may be dried, as by heating to about 40 to about 50° C. under a vacuum. The dried material is the polysaccharide product described above. It may be used as such, or it may be ground to a powder, preferably such that it passes through a 60 mesh screen. The product, before or after drying, may also be dissolved in water, say to a concentration of from about 2 to about 5%, and spray dried or spread on a surface, like a plate or revolving drum, and dried as a thin film. The product resulting from drying as a thin film is easily dispersible in water, whereas the product simply dried and ground requires more agitation in order to disperse in water.

The invention will be more readily understood from a consideration of the specific examples which are given for the purpose of illustration only and are not intended to limit the scope of the invention in any way.

*Example 1*

Ten thousand grams of aloe leaf are shredded to give 8000 g. of juice. A 2% aqueous phosphomolybdic acid (2% of $H_3PO_4 \cdot 12MoO_3$, by weight) solution in the amount of 0.005 gram of solution, is added to the juice and the mixture is stirred. The precipitate which forms is filtered off, and the filtrate is poured into 32,000 g. of methanol and the mixture is stirred. The resulting blue-green precipitate is filtered off and it, amounting to 50 g., is added to 500 g. of 99% methanol. Aqueous hypochlorous acid, in an amount equivalent to 2.5 g. chlorine, is added, and the precipitate becomes white. The white precipitate is filtered off and is washed by mixing with 300 g. 99% methanol and centrifuging. This washing is repeated three more times. Following the last washing, the white, amorphous, fibrous precipitate is dried under vacuum, at 40–50° C., and ground to a white, amorphous powder through 60 mesh. This material may be dispersed in water with the aid of a blender, colloid mill or ultrasonic vibration.

The product has a molecular weight of about 450,000 and analyzes as follows:

| | Percent |
|---|---|
| Gluecose residue | 37.7 |
| Mannose residue | 37.7 |
| Glucuronic acid residue | 1.8 |
| Calcium (chemically bound) | 14.9 |
| Water (chemically bound) | 7.9 |

*Example 2*

In this example the procedure of Example 1 is followed except that 45,000 g. ethanol is used in place of the 32,000 g. of methanol in the formation of the blue-green precipitate, and 600 g. of ethanol is used in place of the 500 g. of methanol in the hypochlorous acid-treating step.

*Example 3*

In this example the procedure of Example 1 is followed using, however, 55,000 g. of a 3:1 mixture of ethanol and isopropanol in place of the 32,000 g. of methanol.

*Example 4*

In this example the procedure of Example 1 is followed using, however, 45,000 g. of isopropanol in place of the 32,000 g. of methanol.

*Example 5*

In this example the procedure of Example 1 is followed using, however, 64,000 g. of a 50:50 mixture of methanol and diethyl ether in place of the 32,000 g. of methanol.

*Example 6*

In this example the procedure of Example 1 is followed using, however, 36,000 g. of acetone in place of the 32,000 g. of methanol.

*Example 7*

In this example the procedure of Example 1 is followed except that absolute methanol, instead of 99% methanol, is used to wash the white precipitate to provide a product substantially free from chemically bound water.

*Example 8*

The powdered product of Example 1 is dispersed in water to a concentration of 4%, and drum dried, under vacuum, at 40–50° C. The resulting product, in the form of thin flakes, is instantly dispersible in water.

Work with rabbits having severe burn injuries has shown that the product of the invention produces marked healing when applied externally as an aqueous gel to the burn itself.

Modification is possible in the selection of equivalent solvents, precipitants and reagents as well as in the procedural techniques selected without departing from the scope of the invention.

I claim:

1. A process for producing a novel, highly pure derivative from the juice of the leaves of the aloe plant which comprises: mixing with the juice a dilute aqueous solution of phosphomolybdic acid until precipitation of insoluble matter is substantially complete; separating the insoluble precipitate from the aqueous solution; mixing the aqueous solution with a water-soluble, lower aliphatic polar solvent until precipitation of blue-green insoluble matter is substantially complete; adding to the resulting dispersion of blue-green precipitate aqueous hydrochlorous acid until said precipitate is essentially white, and recovering the precipitate.

2. The process of claim 1 wherein said water-soluble lower aliphatic polar solvent is at least one selected from the group consisting of methanol, ethanol, isopropanol, acetone and mixtures thereof with diethyl ether.

3. The process of claim 1 wherein the white precipitate is washed with a water-soluble, lower aliphatic polar solvent.

4. The process of claim 3 wherein said solvent is hydrous.

5. The process of claim 3 wherein said solvent is essentially anhydrous.

6. A polysaccharide in the form of a polymer chain of recurring units having the formula $$[(glucose)_m \cdot (mannose)_m \cdot (Ca\ glucuronate)_n \cdot (Ca)_p \cdot YH_2O]_x$$

where $m$ is an integer providing from about 35 to about 40%, by weight, of the unit; $n$ is an integer providing from about 1 to about 2% of the unit; $p$ is an integer which, together with the calcium of the Ca glucuronate portion of the unit, provides from about 13 to about 16% of the unit; $Y$ is an integer providing from 0 to about 9% of the unit, and $x$ is an integer providing a molecular weight from about 420,000 to about 520,000.

7. The hydrate of the product of claim 6 in which $Y$ is an integer providing from about 6 to about 9% of the unit.

References Cited
UNITED STATES PATENTS 3,054,689  9/1962  Jeanes et al. _____ 260—209

LEWIS GOTTS, *Primary Examiner.*

J. R. BROWN, *Assistant Examiner.*